(12) United States Patent
Naibo et al.

(10) Patent No.: US 9,135,583 B2
(45) Date of Patent: Sep. 15, 2015

(54) SYSTEMS AND METHODS TO CREATE CONTINUOUS QUERIES ASSOCIATED WITH PUSH-TYPE AND PULL-TYPE DATA

(75) Inventors: Alexis Naibo, Levallois-Perret (FR); Dan Cristian Marinescu, Puteaux (FR); Jean-Claude Grosselin, Viroflay (FR)

(73) Assignee: BUSINESS OBJECTS S.A., Levallois-Perret (FR)

( * ) Notice: Subject to any disclaimer, the term of this patent is extended or adjusted under 35 U.S.C. 154(b) by 2053 days.

(21) Appl. No.: 12/173,997

(22) Filed: Jul. 16, 2008

(65) Prior Publication Data

US 2010/0017380 A1    Jan. 21, 2010

(51) Int. Cl.
*G06F 7/00* (2006.01)
*G06F 17/00* (2006.01)
*G06Q 10/06* (2012.01)
*G06F 17/30* (2006.01)
*G06Q 30/02* (2012.01)

(52) U.S. Cl.
CPC .......... *G06Q 10/06* (2013.01); *G06F 17/30398* (2013.01); *G06F 17/30516* (2013.01); *G06F 17/30572* (2013.01); *G06Q 30/02* (2013.01)

(58) Field of Classification Search
CPC ............................................... G06F 17/30572
USPC .......................................................... 707/668
See application file for complete search history.

(56) References Cited

U.S. PATENT DOCUMENTS

2008/0209078 A1 * 8/2008 Bates et al. ..................... 710/10

OTHER PUBLICATIONS

Lars Brenna and Dag Jahansen, "Configuring Push-Based Web Services", IEEE Computer Society, Proceedings of the International Conference on Next Generation Web Services Practices (NWebSP'05), 0-7695-2452-4, Copyright 2005 IEEE, 6pgs.
Wikipedia, the free encyclopedia, "Complex Event Processing", Retrieved Jul. 2, 2008. Retrieved from Internet: URL: http://en.wikipedia.org/wiki/Complex_Event_Processing, 2pgs.
The Complex Event Processing Resource Site, "Complex Event Processing: A New computer Model", Retrieved Jul. 2, 2008, Retrieved from Internet: URL: http://www.eventstreamprocessing.com/index.htm, 1pg.

(Continued)

*Primary Examiner* — Fred I Ehichioya
*Assistant Examiner* — Kris Mackes
(74) *Attorney, Agent, or Firm* — Buckley, Maschoff & Talwalkar LLC

(57) ABSTRACT

A system, method, means, and/or computer program code may be provided to facilitate query creation and a presentation of information to a user. According to some embodiments, continuous query definition parameters are received from a user via a graphical user interface. Moreover, semantic layer information associated with an event processing engine may be retrieved, the event processing engine being adapted to receive an event stream. Based on the continuous query definition parameters, a pre-fetch query may be automatically created to pre-fetch historical data from a database. An event processing language statement may also be created based on (i) the continuous query definition parameters and (ii) the semantic layer information. The event processing language statement may be provided to the complex event processing engine so as to establish a continuous query. A response to the query may be output based on both the pre-fetched historical data and events in the event stream.

20 Claims, 12 Drawing Sheets

(56) References Cited

OTHER PUBLICATIONS

Event processing use cases, "Applications of CEP", Retrieved Jul. 2, 2008. Retrieved from Internet: URL: http://www.eventstreamprocessing.com/CEPApplications.htm, 4pgs.

Thomas Bernhardt and Alexandre Vasseur, "Complex Event Processing Made Simple Using Esper", Apr. 2008, Enterprise Java Community, Retrieved Jul. 2, 2008, Retrieved from Internet: URL: http://www.theserverside.com/tt/articles/article.tss?l=ComplexEventProcessing, 5pgs.

"Complex Event Processing", Steambase, Retrieved Jul. 2, 2008. Retrieved from Internet: URL: http://www.streambase.com/complex-event-processing.htm, 4pgs.

"Complex Event Processing Tutorial", Retrieved Jul. 2, 2008. Retrieved from Internet: URL: http://www.eventstreamprocessing.com/CEP-tutorial.htm, 2pgs.

Gideon Low and Jags Ramnarayan, "Java Feature—Building Real-Time Applications with Continuous Query Technology", Aug. 28, 2006 05:30PM, Retrieved Jul. 2, 2008. Retrieved from Internet: URL: http://java.sys-con.com/read/260054_2.htm, 5pgs.

* cited by examiner

FIG. 11

| QUERY IDENTIFIER 1102 | CLIENT IDENTIFIER 1104 | EVENT NOTIFICATION INFORMATION 1106 | PULL-TYPE INFORMATION 1108 | OUTPUT DATA 1110 |
|---|---|---|---|---|
| Q01 | C01 | US_SALES < $1K/SEC | LAST YEARS SALES | PUSH TO CLIENT ONCE PER SECOND |
| Q02 | C02 | PACKAGE DELAY > 2 DAYS | OLAP DB | CURRENTLY NONE |
| Q03 | http://sample.com/sample | ERROR RATE > 5% OR OUTPUT < THRESHOLD | NONE | CURRENTLY NONE |
| Q04 | username: sample password: 123 | > 110 COMPLAINTS IN 24 HOUR PERIOD | OLAP DB | PUSH TO CLIENT WHEN CHANGE |

1100

SYSTEMS AND METHODS TO CREATE CONTINUOUS QUERIES ASSOCIATED WITH PUSH-TYPE AND PULL-TYPE DATA

CROSS-REFERENCE TO RELATED APPLICATIONS

The present application is related to the following US Patent Applications filed concurrently herewith: (i) U.S. patent application Ser. No. 12/173,951 entitled "SYSTEMS AND METHODS TO PROVIDE BUSINESS INFORMATION VIA A PUSH MODEL", and (ii) U.S. patent application Ser. No. 12/173,979 entitled "SYSTEMS AND METHODS TO CREATE CONTINUOUS QUERIES VIA A SEMANTIC LAYER". The entire contents of those applications are incorporated herein by reference.

FIELD

Some embodiments of the present invention relate to business information, business intelligence, and/or enterprise systems. In particular, some embodiments relate to systems and methods using a semantic layer to create continuous queries associated with push-type and pull-type business information, such as business intelligence and/or enterprise system data.

BACKGROUND

A business intelligence and/or enterprise system can improve an organization's ability to monitor and manage data in a complex business environment. For example, the systems offered by Business Objects SA of Levallois-Perret, France and SAP AG of Walldorf, Germany, provide components and tools that allow users to monitor, retrieve, view and manipulate business information, including business warehouse data stored and event streams maintained as part of a company's overall business intelligence tools. By way of examples only, business information might be associated with a number of different product lines, profit values, customer groups, fiscal years, distribution regions, product costs, product quantities, revenues, and/or dates. Moreover, the business information may be stored and retrieved in a variety of ways. Examples of data sources include real-time data streams, events coming through notifications, and databases (e.g., relational, transactional, hierarchical, multi-dimensional, and/or object oriented databases).

In some cases, a user may want to be presented with particular information under specific conditions. For example, a user might wish to be alerted when a current rate of production falls below a pre-determined value. Similarly, a user might want to access analytic information associated with an enterprise. Typically, a client device associated with the user (e.g., his or her computer) retrieves the desired information from a server. For example, the client device might poll the server every 10 milliseconds to retrieve the latest data by periodically issuing Standard Query Language (SQL) commands to "pull" information from a relational database.

Such an approach, however, can be impractical—especially when there are a relatively large number of users and/or data items that need to be processed. For example, it can be difficult to scale a client side pull-based architecture for hundreds of users when tens of thousands of events occur per second. Moreover, it can be difficult to process large amounts of data and provide appropriate indications to a large number of users with relatively low latency (e.g., a few milliseconds between the occurrence of an event and providing notifications to appropriate users).

Moreover, a user may find it difficult to establish a query associated with one or more event streams or with push and pull data sources. For example, the computer programming statements, various event parameters, and database operations associated with a query may be complex and hard to define. The process may be especially time consuming and error prone for business users (who typically do not have a lot of experience working with computer programming statements).

It would be desirable to provide improved methods and systems that facilitate a presentation of business information by a user, including situations where there is a relatively large amount of data and/or a relatively large number of users. In addition, it would be desirable to facilitate the efficient creation of queries by business users.

BRIEF DESCRIPTION OF THE DRAWINGS

FIG. 11 is a tabular representation of a portion of a query database according to some embodiments.

DETAILED DESCRIPTION

Figure 1:
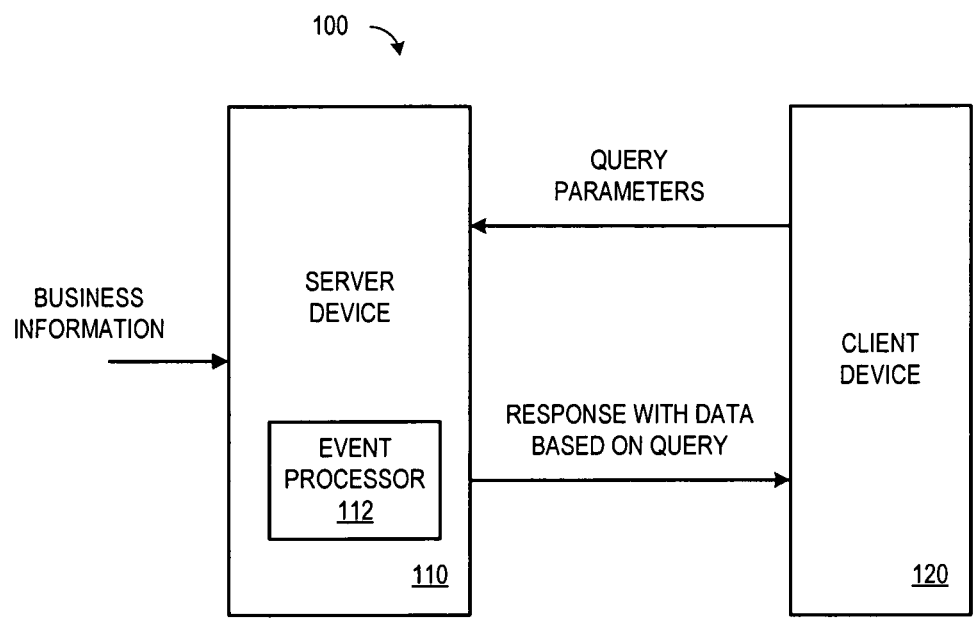
FIG. 1 is a block diagram of a system according to some embodiments of the present invention.

To alleviate problems inherent in the prior art, some embodiments of the present invention introduce systems, methods, computer program code and/or means for using a semantic layer to create continuous event queries associated with business information, such as business intelligence and/or enterprise system data. For example, FIG. 1 is a block diagram of a system 100 according to some embodiments of the present invention. The system 100 includes a server device 110, such as a device that accepts requests and/or transmits responses (e.g., Hypertext Transfer Protocol (HTTP) requests and responses) in connection with an enterprise infrastructure.

The server device 110 may also receive and/or determine "business information" associated with an enterprise. For example, the server device 110 may receive one or more streams of event data associated with an enterprise (e.g., sales volume data, profit information, and/or quality statistics).

According to some embodiments, the server device 110 includes an event processor 112 to monitor streams of business information event data. The event processor 112 might, for example, detect patterns of events (event correlation), filter events, aggregate events, and/or join event streams. Such an event processor 112 may have a relatively high throughput to process large volumes of messages (e.g., 100,000 messages per second) with a relatively low latency (e.g., several milliseconds). Note that the server device may also be able to access "pull-type" information, such as data that may be retrieved from a relational database.

The server device 110 may exchange information with one or more remote client devices 120 via a communication network. The client devices 120 might be associated with, for example, Personal Computers (PCs), portable computing devices such as Personal Digital Assistants (PDAs), or any other appropriate storage and/or communication devices. As used herein, devices (including the server device 110 and client device 120) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single server device 110 and client device 120 are shown in FIG. 1, any number of such devices (and any other device described herein) may be included according to embodiments of the present invention. Moreover, in some embodiments, the server device 110 and client device 120 might be co-located and/or may comprise a single apparatus.

According to some embodiments, the client device 120 is adapted to display a desktop "widget" and/or a web analytic interface to a business user, or it can be running a rich Internet application that allows displaying dynamic business content. For example, a dashboard graphical component might display current sales information to a business user. Moreover, according to some embodiments a business user or system designer may define or select one or more "queries" to obtain business information of particular interest to the user. For example, a user might configure a dashboard display to provide a visual or audible alert when profit information associated with a particular region (e.g., Europe or Asia) falls below a pre-determined threshold level.

Figure 2:
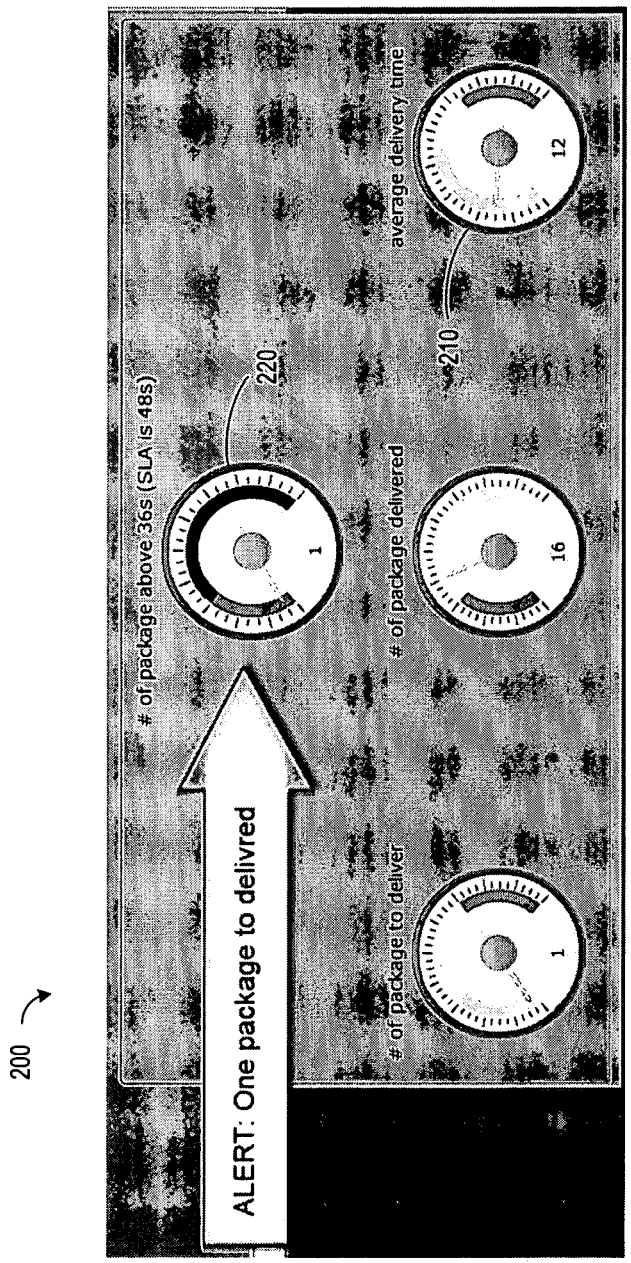
FIG. 2 illustrates a dashboard type display in accordance with some embodiments.

By way of example only, FIG. 2 illustrates a dashboard type display 200 that might be provided at a client device 120 in accordance with some embodiments. In particular, the display 200 might be associated with a Service Level Agreement (SLA) dashboard that provides event driven delivery intelligence to a business user. The display 200 may include information that is updated in substantially real-time, such as an average delivery time dial 210. The display 200 may also include one or more alerts, such as an alert dial 220 that appears when a time associated with one or more packages awaiting delivery rises above a threshold value (e.g., 36 seconds).

The client device 120 may send subscription information (e.g., including information about the particular query of interest to the user and some parameter like the threshold level) to the server device 110. The event processor 112 may then monitor the incoming business information to determine whether or not one or more conditions associated with the query are currently satisfied. The server device 110 may also, according to some embodiments, associate and leverage "pull-type" information, such as information that is retrieved from a relational database, in connection with the query.

In an illustrative example, consider a manager of a delivery service who is interested in monitoring package delivery times and failures. In this case, he or she may configure a desktop widget on a client device 120 to provide an alert when the average time associated with today's deliveries falls below the average time that existed at the same time exactly one year prior to the current day (e.g., as stored in a historical database of past delivery times). The client device 120 might transmit a request to the server device 110 (including details of the manager's query). The server device 110 might fetch the historical information from a relational database and use the event processor 112 to subscribe to the corresponding continuous query on the current delivery information (e.g., one or more incoming event streams) and get notified when the event processor 112 determines that a condition associated with the user's continuous query is satisfied (e.g., when the average delivery time falls below last year's value). When notified, an appropriate alert will be displayed to the manager.

Figure 3:
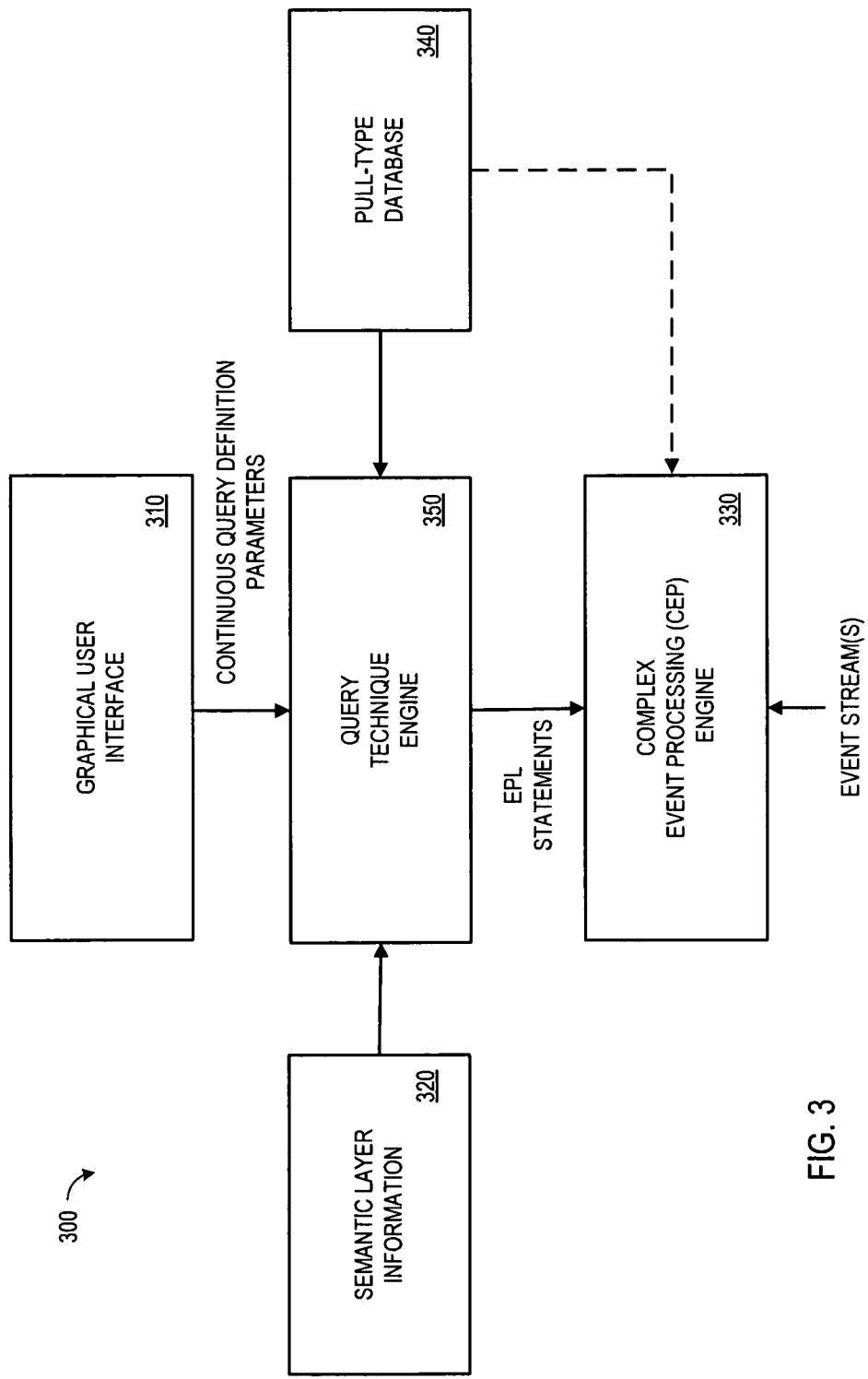
FIG. 3 is a block diagram of a server-side system according to some embodiments of the present invention.

FIG. 3 is a block diagram of a server-side system 300 according to some embodiments of the present invention. In this case, a Graphical User Interface (GUI) 310 may provide one or more continuous query definition parameters to a query technique engine 350. The continuous query definition parameters may, for example, be provided by a business user of the GUI 310 in connection with a query request and may define events that are of interest to the user.

The query technique engine 350 may also retrieve semantic layer information 320 associated with a complex event processing engine 330. The complex event processing engine may, for example, be adapted to receive multiple business information event streams.

Further note that the business information notifications and/or events can contain data that comes from additional data sources. For example, the complex event processing engine might receive historical information related to the business information (e.g., prior sales figures), data from enterprise databases and applications, and/or information from Online Analytic Programming (OLAP) sources. Thus, the query technique engine 350 may further retrieve data from a pull-type database 340. For example, historical sales information might be stored in the pull-type database 340 and the query technique engine 350 (or any other component of the system 300) may issue a query to pull that information from the database 340. According to some embodiments, the query technique engine 350 is adapted to automatically pre-fetch information from the pull-type database 340 in connection with the continuous query definition parameter created by the business user (and perhaps the semantic layer information 320). According to other embodiments, the complex event processing engine 350 may instead retrieve information from the database 340 (as indicated by the dashed line in FIG. 3).

According to some embodiments, the query technique engine 350 is also adapted to automatically create a statement based on (i) the continuous query definition parameter created by the business user and (ii) the semantic layer information 320. The query technique engine 350 may provide the statement to the complex event processing engine 330 so as to establish a continuous query at the complex event processing engine 330. For example, the continuous query might provide output data (e.g., notifications) based on events in the business information event streams and information in the pull-type database 340.

The "statement" automatically generated by the query technique engine 350 may, for example, comprise one or more Event Programming Language (EPL) statements that define queries on an event stream to address the event stream analysis requirements of complex event processor applications. Such EPL statements may provide the windows, aggregation, joining, and/or analysis functions for use with streams of events and may follow a specific EPL syntax. According to some embodiments, EPL statements contain definitions of one or more "views" that define the data available for querying and/or filtering. Note that views might be mapped on windows over a stream of events and/or staggered onto each other to build a chain of views.

When it is determined that the event streams and/or the pull-type database 340 information satisfy a condition associated with the query, information may be transmitted to a business user via a push-model (e.g., a subscription based push-model). Note that a query defined via the GUI 310 might be associated with, for example, the occurrence of a particular event in a particular stream. According to some embodiments, the query might be associated with a number of different events and/or different types of events (associated with one or more event streams). In this case a condition associated with a query may be further associated with a rule (e.g., event one occurs before event two), a logical operation (e.g., a Boolean operation such as event one and event two exist at the same time or an event contains a value greater than a defined threshold value), or a formula (e.g., a value associated with event one exceeds a value associated with event two by fifty percent). Moreover, the complex event engine 330 might look for patterns among the multiple streams of event data, find event correlations, and/or perform event filtering tasks.

Similarly, push-type information (e.g., event) and pull-type information may be combined by the system 300. For example, a metadata designer might add pull entities (and relationships) to the event driven semantic layer's push entities and relationships. Moreover, various kinds of join operations (e.g., inner and outer) may be supported by the event driven semantic layer 320 between pull entities and push entities. Further, aggregations might be calculated between different types of entities. In order to improve performance, a system user might retrieve all the pull data corresponding to a query and then join this data to the push data with a continuous query.

According to some embodiments, relational or OLAP data (e.g., in the pull-type database 340) may be transformed into events and sent to a continuous query that joins both push-type and pull-type data sources. Merging of pull-type and push-type data might be performed, for example, in an engine's memory based on the defined joins. Scheduling retrieval of pull-type data from the pull-type database 340 may maintain an up-to-date system without over charging data warehouses. The data retrieval may, according to some embodiments, only be done when a user is connected to the continuous query in order to lower the memory requirements of the system 300.

Figure 4:
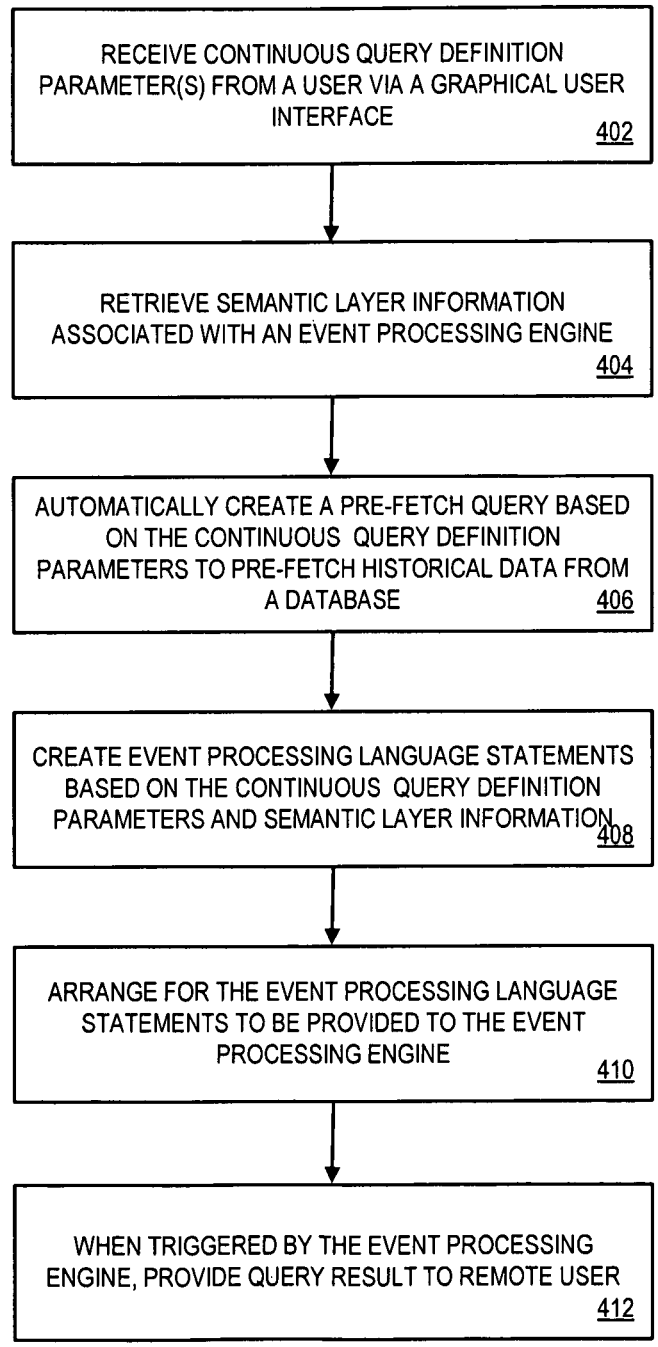
FIG. 4 is a flow diagram of a method to facilitate a presentation of information according to some embodiments.

Thus, according to some embodiments, a query technique engine 350 may be advantageously used by the system 300 to facilitate event-based query creation and a presentation of business information to a user. For example, FIG. 4 is a flow diagram of a method that may be performed by the server device 110 of FIG. 1 and/or the query technique engine 350 of FIG. 3 according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 402, continuous query definition parameters are received at a query technique engine. The continuous query definition parameters may, for example, be received from a user via a GUI and might be associated with: (i) an event driven universe, (ii) an event driven query, (iii) a class, (iv) an object, (v) an adapter, (vi) a source stream, (vii) a target, and/or (viii) a filter.

At 404, semantic layer information is retrieved by the query technique engine. The semantic layer information may, for example, be associated with an event processing engine adapted to receive at least one event stream from at least one data source. The semantic layer information might include, for example: (i) schema definitions, (ii) tables defining attributes, (iii) business object metadata, (iv) metadata based on an entity relationship model, (v) a metadata name, (vi) a metadata description, (vii) a metadata object type, (viii) dimension, measure, detail, or pre-condition object definitions, (ix) a metadata data type, (x) a metadata aggregation type, (xi) metadata distinction information, (xii) metadata formula information, (xiii) stream adapter metadata, (xiv) event driven universe metadata, and/or (xv) query panel information.

At 406, the query technique engine may automatically create a pre-fetch query based on the continuous query definition parameters from the user. For example, the pre-fetch query might pre-fetch historical data from a database (associated with a pull-model). Thus, some embodiments of the present invention may leverage existing semantic layer entities and relationships and combine them with a new event driven semantic layer. Relational or OLAP data retrieval might be performed while continuous queries are running (or using a scheduling operation). When an event driven entity is updated (a new event is pushed into the system), the relational or OLAP data required may be already loaded and the calculations may be performed relatively fast. Whenever pull data is refreshed, according to some embodiments, it may be transformed into events and sent throughout the system.

At 408, processing language statements are created (e.g., are automatically created) at the query technique engine. The statements might comprise EPL statements and may be created, for example, based on (i) the continuous query definition parameters from the user and (ii) the semantic layer information.

At 410, it is arranged for the event processing language statements to be provided to the event processing engine so as to establish a continuous query at the event processing engine. The continuous query may, for example, provide output data based on events in the event stream (and the events in the event stream are associated with a push-model). Note that according to some embodiments, the continuous query may be associated with an event aggregation, an event abstraction, and/or a complex event. Moreover, the system may join historical data with information associated with events in the event stream. For example, the joining might be associated with an inner join, an outer join, a left join, a right join, and/or a full join.

Responsive to the output data, information may be transmitted at 412 to a remote business user via a push-model. The transmitted information might, for example, be associated with: (i) a web service associated with a client, (ii) a desktop widget application associated with a client, (iii) a dashboard application associated with a client, (iv) a web analytic application associated with a client, and/or (v) a web browser application associated with a client. Moreover, the information might be transmitted to a remote device, such as a personal computer and/or a wireless device.

Thus, some embodiments of the present invention may provide a "push-model" wherein the server determines if (and when) information will be sent to the client. In addition, the push-model may additionally support pull-type data sources. Moreover, a user can provide information via a GUI and the appropriate database queries and EPL statements may be automatically generated for the user based on information in a semantic layer.

Figure 5:
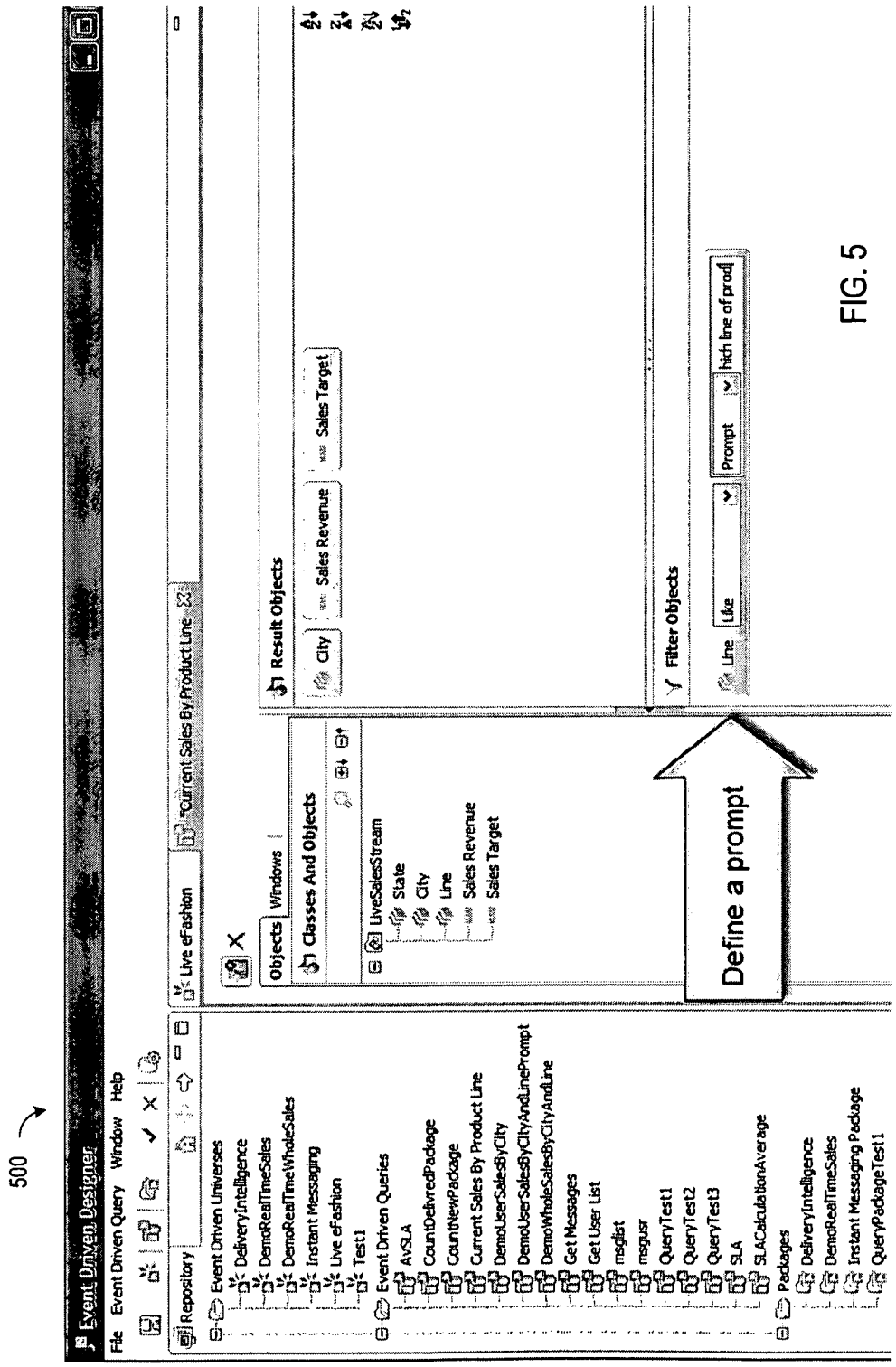
FIG. 5 illustrates a graphical user interface associated with the creation of a continuous query in accordance with some embodiments.

FIG. 5 illustrates a GUI 500 associated with the creation of a continuous query in accordance with some embodiments. In particular, the GUI 500 is associated with an event driven designer that includes repositories of event driven universes, event driven queries, and packages (e.g., each associated with multiple queries). The user may define business objects, such as result objects (e.g., to receive the query result) and filter objects (e.g., to create a filter for a query). According to some embodiments, the user may drag and drop icons associated with presentation and/or definition data to define an object. For example, presentation information might include a business name, a description, and/or qualification information (e.g., dimension, attribute, property, measure). Note that a user may define a continuous event-driven query using objects with business terms (instead of working directly with the different data sources, including real-time/event-driven and relational/OLAP sources).

According to some embodiments, a user may create a "window" that defines a bounded portion of an event stream. For example, the user might provide a window time parameter (e.g., all events in the last hour or in the current hour), a window count parameter (e.g., the last fifty events), window sliding information, window cycling information, window unique information, window top information (e.g., the events with the thirty highest values), and/or window bottom information. The window parameters are applied, according to some embodiments, only on objects that are based on event-driven or real-time data sources.

Figure 6:
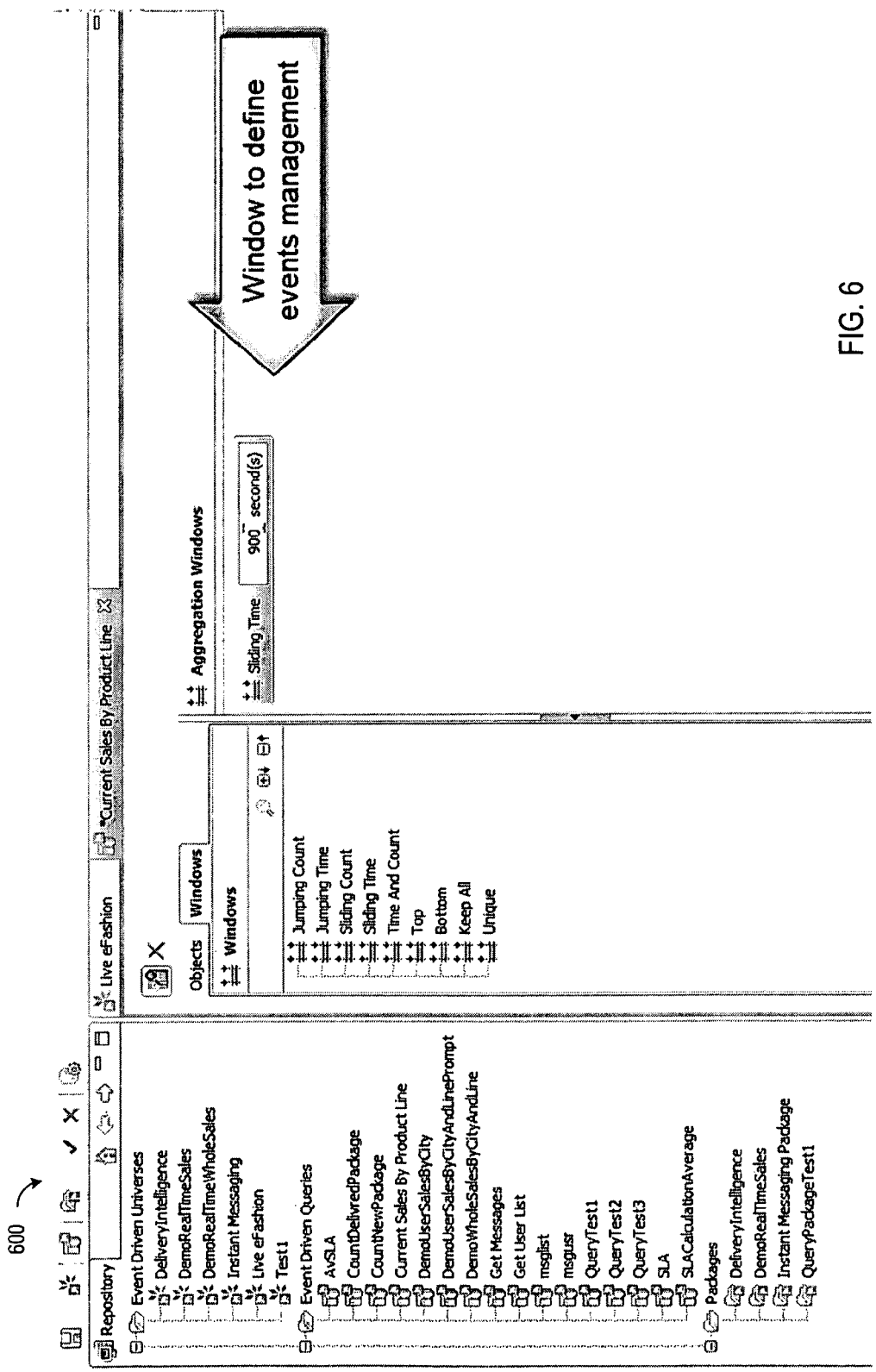
FIG. 6 illustrates a graphical user interface associated with a window parameter definition in accordance with some embodiments.

FIG. 6 illustrates a GUI 600 associated with a window parameter definition in accordance with some embodiments. In this case, the GUI 600 may be used to create a window to define events management for a business user. For example, the business user might drag and drop icons to aggregate several different types of windows (e.g., a sliding time window of 900 seconds). In this way, the user can define which events he or she is interested in.

Figure 7:
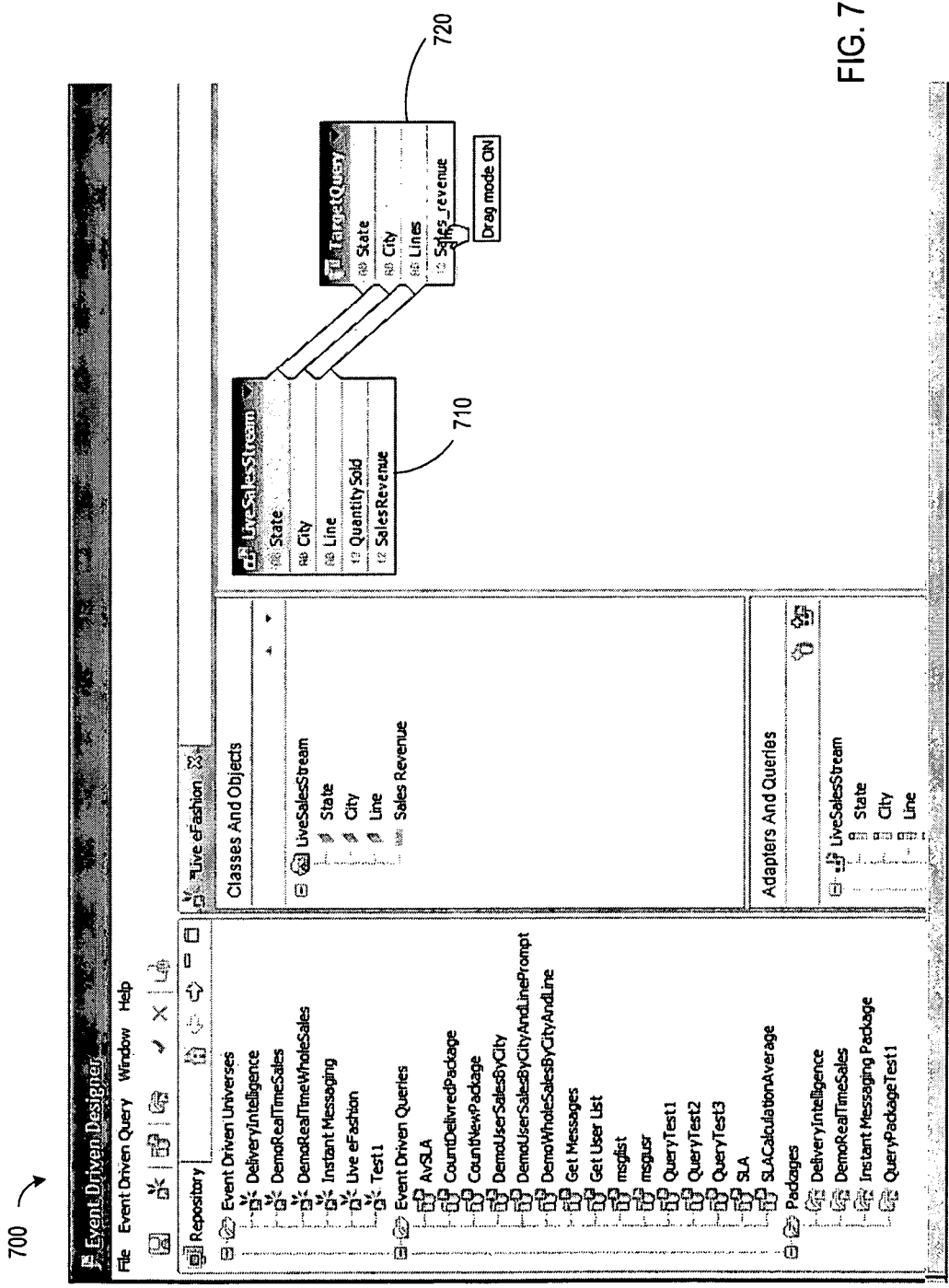
FIG. 7 illustrates a graphical user interface associated with pull-type information in accordance with some embodiments.

In addition to event data, the business user may access pull-type data, such as information stored in a relational database. For example, FIG. 7 illustrates a GUI 700 associated with pull-type information in accordance with some embodiments. In particular, an event driven business object 810 may be graphically (and thus logically) linked to pull type information 820 via the GUI 700. Thus, one possible embodiment provides an event driven semantic layer that allows the creation of continuous queries. A metadata designer may then add to the semantic layer "pull" entities and relationships in addition to the push entities and relationships. According to some embodiments, different types of join operations (e.g., inner and outer) may be supported by the event driven semantic layer between pull entities and push entities.

Figure 8:
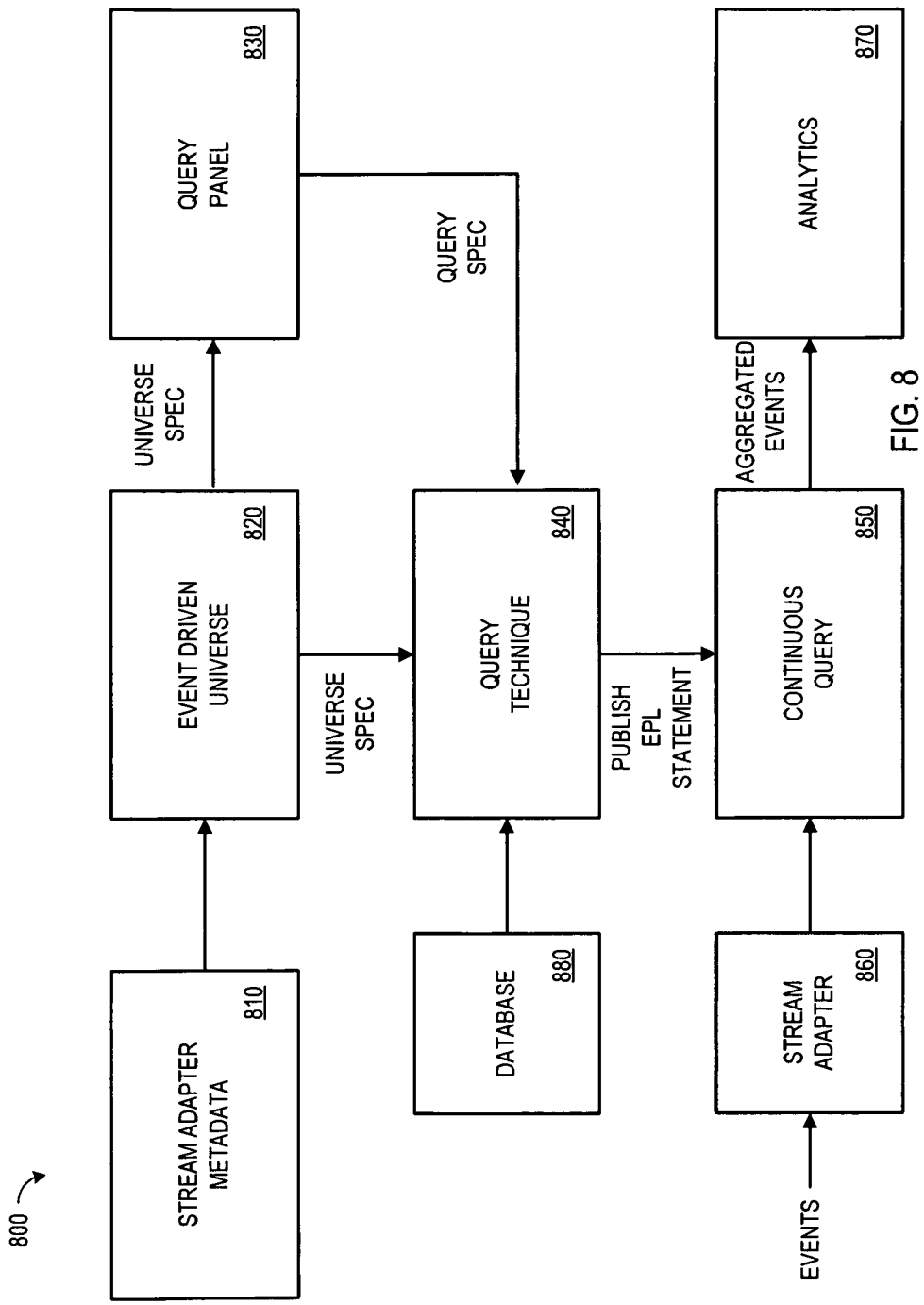
FIG. 8 is an event-driven business information semantic layer component diagram according to some embodiments.

FIG. 8 is an event-driven business information semantic layer component diagram 800 according to some embodiments. The component diagram 800 includes one or more stream adapter metadata components 810 that may, for example, be associated with stream adapters that are installed on an application server and that are self-defining (e.g., column, type, nullable). According to some embodiments, such adapters may be developed using a Java-based software development kit. According to some embodiments, and adapter may be provided to retrieve pull-type data from a relational database.

The stream adapter metadata component 810 may provide information to an event driven universe component 820. The event driven universe component 820 may, for example, be based on an entity-relationship model (including both push and pull entities). For example, with respect to the entity portion of such a model, stream adapter metadata might be provided using a table/field metaphor. Moreover, each table may have a type, a name, and list of associated fields (which turn each have a name and type). According to some embodiments, an entity might comprise an alias of another entity. With respect to the relationship portion of such a model, various types of joining operations mighty be supported (e.g., inner joins, right joins, left joins, and/or full outer joins). According to some embodiments, multiple relationships may exist between entities.

The event driven universe component 820 may further utilize business objects. For example, the business object metadata might include a name and description, an object type (e.g., dimension, measure, detail, and pre-condition), a data type, an aggregation type or distinction, a formula (e.g., math, concatenation, or trim). According to some embodiments, classes may be used to order business objects.

The event driven universe component 820 may provide a universe specification to a query panel component 830. The query panel component 830 may be associated with, for example, a result object list defined when a user drags and drops a universe object into a result object area. The user may be able to publish, start, stop, or delete a query. According to some embodiments, a sort may be defined on the result objects. The query panel component 830 may further be associated with object tree conditions defined when a user drags and drops a universe object into a tree condition structure. Note that an object condition may be associated with a main operand (e.g., a universe object, one or more operators, and a fixed value or prompt operand).

The query panel component 830 may still further be associated with an aggregation window defining a set of events in an event stream. The window might be defined using a time parameter (e.g., ten hours), a number of events (e.g., the last ten thousand events on each dimension), the highest or lowest values, or uniqueness (e.g., the last event on each dimension).

A query technique component 840 may receive the universe specification from the event driven universe component 820 along with a query specification from the query panel 830. Based on the universe specification and the query specification, the query technique component 840 may retrieve data from a database 880 (e.g., OLAP data) and/or automatically generate and publish one or more EPL statements to create a continuous query 850. The continuous query 850 receives information about event streams via a stream adapter 860 and provides aggregated event information to an analytics component 870.

Figure 9:
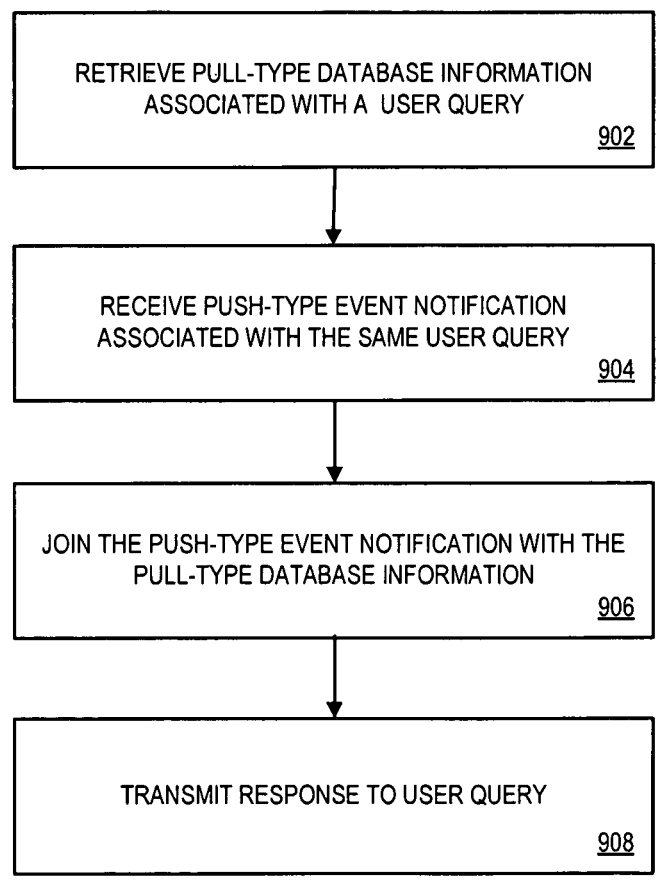
FIG. 9 is a flow diagram of a method to facilitate continuous query execution according to some embodiments.

Once a query for pull-type and push-type data is created, it can be executed when a user is connected to the server. For example, FIG. 9 is a flow diagram of a method to facilitate continuous query execution according to some embodiments. At 902, pull-type database information is retrieved in connection with a user query. This may be performed in connection with a pre-fetch (e.g., even before a condition associated with an event stream is satisfied) and/or be updated according to a pre-determined or user-defined schedule.

At 904, a push-type event notification is received in connection with that same user query. For example, a CEP engine may receive streams of event information via adapters and compare the events with one or more conditions associated with the user's query. When the condition is satisfied, a notification may be issued by the CEP engine.

At 906, the push-type event notification is joined with the pull-type database information. This might be performed, for example, by a CEP engine, a query technique engine, or any other device described herein. At 908, a response to the user query is transmitted. The response might comprise, for example, the information that was joined at 906.

Thus, some embodiments may let a user create in an efficient way a multi-source semantic layer on top of relational or OLAP (pull-type) data sources and event driven (push-type) data sources. Moreover, a semantic layer can contain entities and relationships coming from both push and pull type data sources.

According to some embodiments, relational or OLAP data can be obtained using a user defined query, and its metadata may be automatically represented as pull entities inside an event driven semantic layer. Event driven data may be, for example, provided by adaptors that are connected to enterprise messaging buses, sensors, and/or other sources of live data.

Some embodiments further provide a query technique that allows creation of continuous queries over push-type and pull-type data sources. The query technique may, for example, use path computation algorithms to discover and use the required relationships between entities for a query. A special adapter may be created for pull entities in order to send relational or OLAP data to the continuous query in a way that is similar to push data sources.

Moreover, some embodiments leverage data retrieving, caching, and disposal. Note that the result of this semantic layer may comprise event driven business objects. The results of queries containing business objects can be filtered using inner type joins between relational or OLAP entities and event driven entities (or enhanced using outer type joins between relational or OLAP entities and event driven entities). In some embodiments, row-level security may be provided for the relational or OLAP entities and leveraged inside the event driven semantic layer allowing for the filtering event driven data. Moreover, complex aggregations can be calculated between pull entities and push entities according to some embodiments, and queries over relational or OLAP data may be calculated and/or updated using user rights and/or a system user impersonation.

Figure 10:
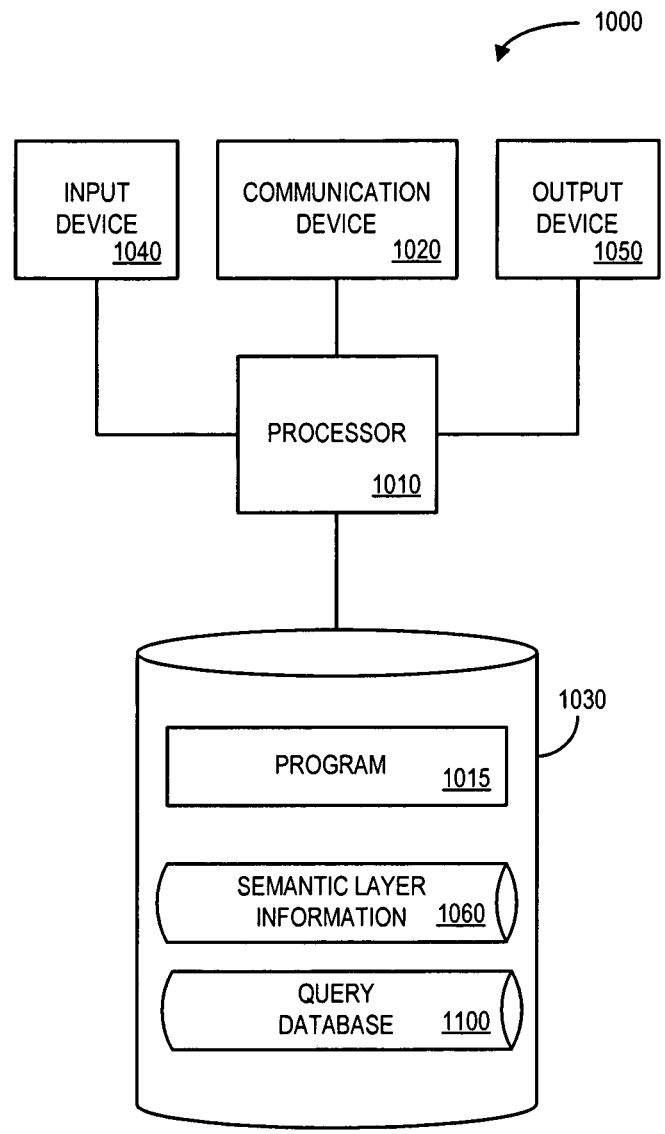
FIG. 10 is a block diagram of an apparatus in accordance with some embodiments of the present invention.

FIG. 10 is a block diagram of an apparatus 1000 in accordance with some embodiments of the present invention. The apparatus 1000 might, for example, be associated with a server such as the server device 110 illustrated in FIG. 1. The apparatus 1000 comprises a processor 1010, such as one or more INTEL® Pentium® processors, coupled to a communication device 1020 configured to communicate via one or more communication networks (not shown in FIG. 10). The communication device 1020 may be used to exchange information with one or more client devices and/or event stream sources.

The processor 1010 is also in communication with an input device 1040. The input device 1040 may comprise, for example, a keyboard, a mouse, or computer media reader. Such an input device 1040 may be used, for example, to define queries and/or query packages. The processor 1010 is also in communication with an output device 1050. The output device 1050 may comprise, for example, a display screen or printer. Such an output device 1050 may be used, for example, to provide reports and/or displays associated with queries and/or query packages.

The processor 1010 is also in communication with a storage device 1030. The storage device 1030 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 1030 stores a program 1015 for controlling the processor 1010. The processor 1010 performs instructions of the program 1015, and thereby operates in accordance with any embodiments of the present invention described herein. For example, according to some embodiments, the processor 1010 receives query definition parameters from a user via a GUI. Based on the query definition parameters, the processor 1010 may automatically create a pull-type query to pull data from a database. Similarly, based on the query definition parameters, the processor 1010 may automatically create a push-type continuous event query. A continuous user-query may then be established by the processor to provide user output data (based on both the pull-type query and the push-type continuous event query).

In some embodiments, the processor 1010 may receive a continuous query definition parameter created by a business user. The processor 1010 may also retrieve semantic layer information 1060 associated with a complex event processing engine, the complex event processing engine being adapted to receive multiple business information event streams. The processor 1010 may also create a statement (e.g., EPL statement or set of statements) based on (i) a continuous query definition parameter created by the business user and (ii) the semantic layer information 1060. The processor 1010 may then provide the statement to the complex event processing engine so as to establish a continuous query at the complex event processing engine, the continuous query providing output data based on events in the business information event streams. The processor 1010 may subsequently receive an indication from the complex event processing engine (e.g., a notification) in connection with the continuous query and transmit information, based on push-type and pull-type information, to one or more business users via a push-model.

As used herein, information may be "received" by or "transmitted" to, for example: (i) the apparatus 1000 from other devices; or (ii) a software application or module within the apparatus 1000 from another software application, module, or any other source.

As shown in FIG. 10, the storage device 1030 may also store semantic layer information 1060. The semantic layer definition parameters may be received, for example, from an Information Technology (IT) semantic layer designer via a GUI. According to some embodiments, at least some of the semantic layer information is associated with a stream adapter metadata component providing metadata associated with connected stream adapters. Moreover, at least some of the semantic layer information may be associated with an event driven universe specification module that enables creation of an event driven universe specification with entities and relationships between entities. In some embodiments, at least some of the semantic layer information is associated with a query panel component that enables creation of a query based on the event driven universe using an interactive user interface.

The storage device 1030 may also store a query database 1100 (described with respect to FIG. 11) according to some embodiments. The illustration and accompanying descriptions of devices and databases presented herein are exemplary, and any number of other arrangements could be employed besides those suggested by the figures. For example, multiple databases associated with different types of business information and/or clients might be associated with the apparatus 1000.

FIG. 11 is a tabular representation of a portion of a query database 1100 according to some embodiments. The table includes entries identifying queries that have been created for remote client devices. The table also defines fields 1102, 1104, 1106, 1108, 1110 for each of the entries. The fields specify: a query identifier 1102, client identifier 1104, an event notification information 1106, pull-type information 1108, and output data 1110. The information in the database 1100 may be created and updated based on information received from client devices, system designers, event streams, and/or relational databases.

The query identifier 1102 may be, for example, an alphanumeric code associated with a particular subscription query executing for a client. The client identifier 1104 may be, for example, an alphanumeric code associated with the client who is subscribing to the query, a Uniform Resource Locator (URL) address associated with the client, a key, a token, or a user name and password. The event notification information 1106 may define part of a condition when information should be "pushed" to the client. The pull-type information 1108 may further define part of a condition when information should be pushed to the client. According to some embodiments, the pull-type information 1108 does not represent a condition but does specify additional data that should be sent to the client when the condition associated with the event notification information 1106 is satisfied. The output data 1110 represents the result that is pushed to the client, including information based on the event notification data 1106 and/or the pull-type information 1108.

Figure 12:
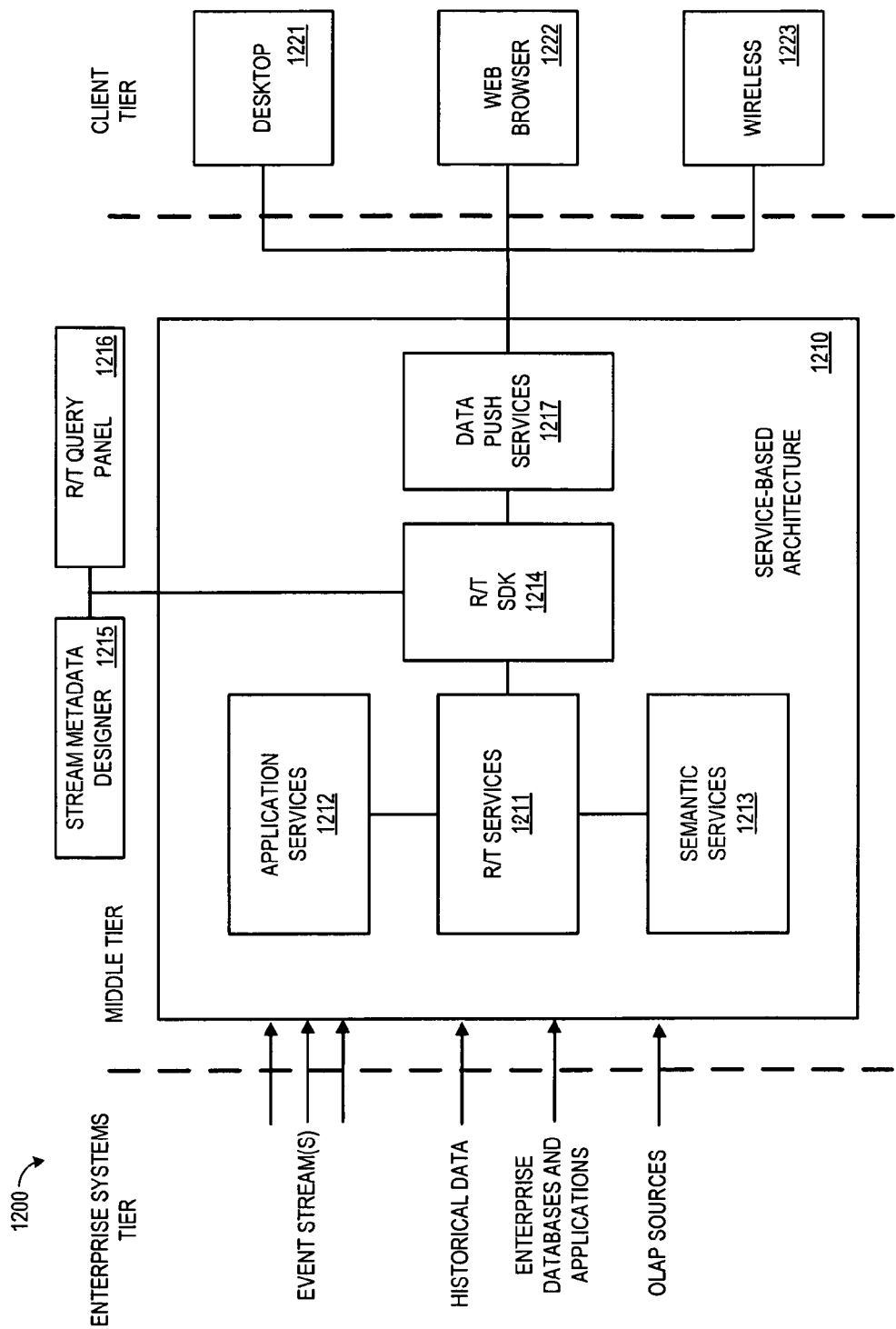
FIG. 12 is a block diagram of a system according to an exemplary embodiment of the present invention.

FIG. 12 is a block diagram of a system 1200 according to an exemplary embodiment of the present invention. According to this embodiment, at least one enterprise systems tier or component may be adapted to provide at least one Real Time (R/T) business information event stream to a middle tier (e.g., including a service-based architecture 1210). Moreover, the event streams may be associated with one or more event stream adapters that provide data to an event driven engine. The event driven engine may, in turn, provide data to a R/T web server to be distributed to various remote clients 1221, 1222, 1223 in a client user interaction tier or component.

The service-based architecture might further receive historical data (e.g., to be used to correlate and compare with R/T data), information from enterprise databases and applications, and/or data from OLAP sources (e.g., associated with a multi-dimensional data schema such as a hypercube). Note, however, that embodiments may be associated with other types of information including data described by a metadata model. Such data may also include information stored in one or more data sources, such as relational databases.

A client user interaction tier or component may be adapted to transmit an HTTP request to the service-based architecture 1210 in connection with a query associated with one or more events in the at least one real-time business information event stream. Examples of devices in the client tier may include a desktop 1221 (e.g., a dashboard or widget running at a PC), a web browser 1222, and a wireless device 1223.

The service-based architecture 1210 may receive the R/T business information event stream and an HTTP request (e.g., a subscription query) from a client device. The data push services 1212 may further push R/T business information to a client device when the condition associated with the query is subsequently satisfied by the R/T business information event stream and/or by historical data stored in a relational or OLAP database.

The service based architecture 1210 may include a number of business services nodes, such as R/T services 1211 that automatically generate EPL statements for a continuous query based at least in part on information retrieved from semantic services 1213. The R/T services 1211 may also process historical and stream-based information. Application services 1212 may provide security, session, and administrative functions. According to some embodiments, a web query may be defined using semantic layer objects and/or interfaces contained in the definitions of event streams The service based architecture 1210 may further include a number of application server container components, such as a R/T Software Development Kit (SDK) 1214 (e.g., including an authoring component and an event driven analytics alerts component). According to some embodiments, the R/T SDK operates in connection with a stream metadata designer 1215 and/or a R/T query panel 1216 to facilitate the automatic and efficient definition of queries.

According to some embodiments, the service-based architecture 1210 may request parameters from a client. For example the service-based architecture 1210 may request token information (allowing the server to uniquely identify the client), timeout information (specifying a maximum time permitted for the server to block the connection with the client), a query package identifier (allowing the server to identify appropriate queries as described with respect to FIG. 5), and/or a list of query input objects (each object including, for example, a timestamp to let the server synchronize with the client, an output limit specifying a rate at which the server may send events to the client, and/or a list of values for each prompt of the query that were specified by a particular user). The service-based architecture 1210 may also send to the client a list of query output objects (each object including, for example, a timestamp to let the client synchronize with the server and/or a data table listing the events that correspond to the user query).

According to some embodiments, a continuous user-query (including push-type and pull-type data) may further be associated with a filter operation, a complex formula, aggregation information, a join operation, an order operation, a group operation, an output rate parameter, and/or a tree of conditions. Moreover, a continuous user-query may be associated with user security information. For example, a set of metadata queries might continually collect information from event streams and/or from relational databases. When a connection with a particular business user is established, his or her login name and password may be required to determine which of that collected information will be accessible.

As a result of embodiments described herein, an event-based push model may be implemented to provide business information to a user and systems and methods are described to facilitate the creation of event queries. Moreover, a sever may process information using an end-to-end event driven architecture such that information is pushed to a user with relatively little latency. Embodiments may also be scalable (e.g., thousands of users might be supported by a server), provide stream filtering on the server side, and/or ensure that a client receives only the data of interest to a user.

Note that the creation of a semantic (e.g., abstract) layer may leverage the automatic creation of continuous queries for a complex event processing engine that works on top of event streams, event driven data sources (e.g., enterprise messaging buses, sensors, or other sources of live data), and historical information such as that associated with relational databases.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware, process steps, and data configurations have been described herein, note that other techniques may be provided in accordance with embodiments of the present invention (e.g., some of the data associated with the applications and databases described herein may be combined or stored in separate systems). Similarly, although a particular information flow and user interactions have been given as examples, other approaches may be implemented. For example, a query response transmitted from a server to a client might be associated with an incremental change in data (as compared to a previously transmitted response).

Applicants have discovered that embodiments described herein may be particularly useful in connection with enterprise business information (e.g., the embodiments might be implemented without major changes to an enterprise infrastructure). Note, however, that other types of event streams and databases might similarly benefit from various embodiments, including those associated with systems that process large amounts of financial information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having stored thereon processor-executable instructions that when executed by a processor result in the following:
   receiving, at a query technique engine, continuous query definition parameters from a user via a graphical user interface;
   retrieving, at the query technique engine, semantic layer information associated with an event processing engine, the event processing engine being adapted to receive an event stream;
   based on the continuous query definition parameters from the user, automatically creating at the query technique engine a pre-fetch query to pre-fetch historical data from a database using a pull-model;
   automatically creating an event processing language statement, by a processor at the query technique engine, the event processing language statement being created based on (i) the continuous query definition parameters from the user and (ii) the semantic layer information; and
   providing the event processing language statement to the complex event processing engine so as to establish a continuous query, the continuous query providing at least one output data value based on both the pre-fetched historical data and new push-model events in the event stream.

2. The computer-readable medium of claim 1, wherein execution of the instructions further results in:
   joining the historical data with information associated with events in the event stream.

3. The computer-readable medium of claim 2, wherein the joining is associated with at least one of: (i) an inner join, (ii) an outer join, (iii) a left join, (iv) a right join, or (v) a full join.

4. The computer-readable medium of claim 1, wherein semantic layer information includes at least one of: (i) schema definitions, (ii) tables defining attributes, (iii) business object metadata, (iv) metadata based on an entity relationship model, (v) a metadata name, (vi) a metadata description, (vii) a metadata object type, (viii) dimension, measure, detail, or pre-condition object definitions, (ix) a metadata data type, (x) a metadata aggregation type, (xi) metadata distinction information, (xii) metadata formula information, (xiii) stream adapter metadata, (xiv) event driven universe metadata, or (xv) query panel information.

5. The computer readable medium of claim 1, wherein the semantic layer information includes at least one of: (i) window information defining a bounded portion of the event stream, (ii) a window time parameter, (iii) a window count parameter, (iv) window sliding information, (v) window cycling information, (vi) window unique information, (vii) window top information, or (viii) window bottom information.

6. The computer-readable medium of claim 1, wherein the continuous query definition parameters from the user include at least one of: (i) an event driven universe, (ii) an event driven query, (iii) a class, (iv) an object, (v) an adapter, (vi) a source stream, (vii) a target, or (viii) a filter.

7. The computer-readable medium of claim 1, wherein execution of the instructions further results in:
   responsive to the output data, transmitting information to a remote business user via a push-model.

8. The computer-readable medium of claim 7, wherein the transmitted information is associated with at least one of: (i) a web service associated with a client, (ii) a desktop widget application associated with a client, (iii) a dashboard application associated with a client, (iv) a web analytic application associated with a client, or (v) a web browser application associated with a client.

9. The computer-readable medium of claim 7, wherein the information is transmitted to at least one of: (i) a personal computer, or (ii) a wireless device.

10. The computer-readable medium of claim 1, wherein at least some of the semantic layer information is associated with a first stream adapter metadata component associated with the event stream and a second stream adapter metadata component associated with the database.

11. The computer-readable medium of claim 1, wherein at least some of the semantic layer information is associated with an event driven universe specification module that enables creation of an event driven universe specification with entities and relationships between entities.

12. The computer-readable medium of claim 1, wherein the continuous query is further associated with user security information.

13. A method, comprising:
   receiving query definition parameters from a user via a graphical user interface;
   based on the query definition parameters, automatically creating a pull-type query to pull data from a database;
   based on the query definition parameters, automatically creating a push-type continuous event query; and
   establishing a continuous user-query, the continuous user-query providing at least one user output data value based on both the pull-type query and the push-type continuous event query, wherein the data pulled from the database is transformed into events before being joined with a push-type continuous event query output.

14. The method of claim 13, wherein the automatic creation of the pull-type query is associated with semantic layer information.

15. The method of claim 14, wherein the automatic creation of the push-type continuous event query is also associated with the semantic layer information.

16. The method of claim 14, wherein the query definition parameters from the user create a query on a universe pointing to a database.

17. The method of claim 16, wherein the query definition parameters from the user define a database query with universe business objects.

18. The method of claim 14, wherein the graphical user interface lets the user graphically connect a graphical representation of pull-type information with a graphical representation of push-type information using a graphical representation of the connection.

19. An apparatus, comprising:
a semantic layer component;
a relational database interface;
a query technique engine including a processor to receive (i) continuous query definition parameters from a graphical user interface component, (ii) semantic layer information from the semantic layer component, and (iii) pre-fetch information from the relational database interface using a pull-model; and
a complex event processing engine to receive an event processing language statement from the query technique engine along with a plurality of event streams from at least one business intelligence data source, wherein the complex event processing engine is to look for event patterns between the plurality of event streams,
wherein an output data value is transmitted based on both the pre-fetched information and event patterns between the plurality of event streams.

20. The apparatus of claim 19, wherein the relational database interface is associated with at least one of: (i) an online analytic programming data source, or (ii) a hypercube.

* * * * *